No. 3,031. REISSUED JULY 14, 1868.
D. S. HOLMAN.
SEED PLANTER.
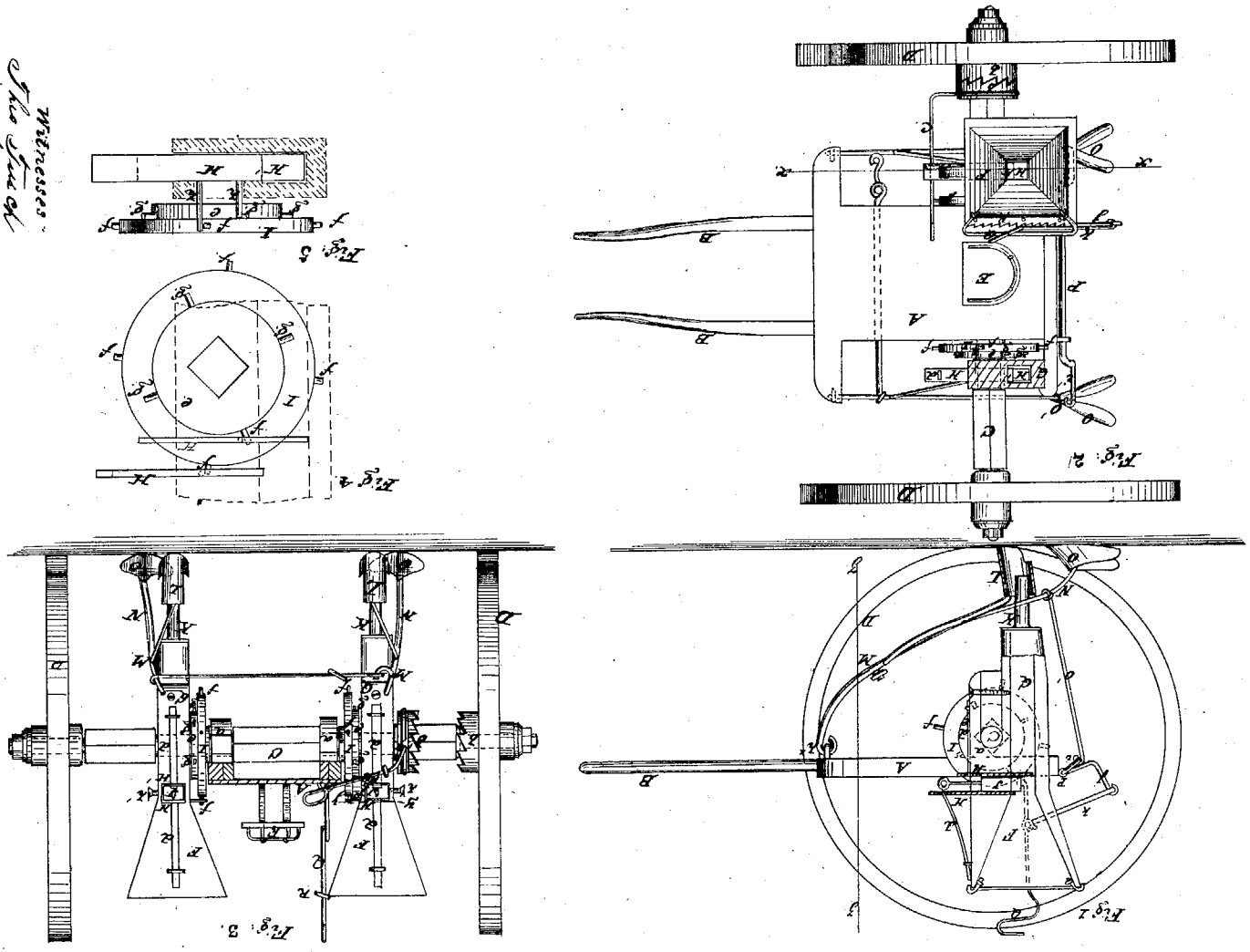
Witnesses:
Thos Tuck
J. A. Service.
Inventor:
D. S. Holman.
THE NORRIS PETERS CO., PHOTO-LITHO., WASHINGTON, D. C.

UNITED STATES PATENT OFFICE.

D. S. HOLMAN, OF CONNEAUTVILLE, PENNSYLVANIA.

IMPROVEMENT IN SEED-PLANTERS.

Specification forming part of Letters Patent No. 61,431, dated January 22, 1867; Reissue No. 3,031, dated July 14, 1868.

*To all whom it may concern:*

Be it known that I, D. S. HOLMAN, of Conneautville, in the county of Crawford and State of Pennsylvania, have invented a new and Improved Seed-Planting Machine; and I do hereby declare that the following is a full, clear, and exact description thereof, which will enable others skilled in the art to make and use the same, reference being had to the accompanying drawings, forming part of this specification, in which—

Figure 1 is a side sectional view of my invention, taken in the line *x x*, Fig. 2; Fig. 2, a plan or top view of the same, with a portion in section, as indicated by the line *y y*, Fig. 3; Fig. 3, a front sectional view of the same, taken in the line *z z*, Fig. 1; Fig. 4, an enlarged detached side view of one of the wheels by which the seed-slides are operated; Fig. 5, a plan or top view of the same.

Similar letters of reference indicate corresponding parts.

This invention relates to a new and improved machine for planting seed; and it consists in a novel seed-dropping device with means for regulating the discharge of the seed, and also in an improved means for opening the furrows and covering the seed after being dropped therein, as hereinafter fully shown and described.

A represents a platform or framing having thills B attached, and bearings *a a*, an axle, C, being fitted in the latter so as to turn freely.

On the axle C two wheels, D D′, are placed loosely, one wheel, D, having a portion or one part, *b*, of a clutch attached to or formed on the inner end of its hub, the other part, *b′*, of the clutch being placed on the axle, so as to be capable of sliding thereon, but at all times turning with it, the part *b′* being moved or adjusted by a lever, *c*, within convenient reach of the driver on seat E.

F F are two seed-boxes, which are secured to a bar at the rear of the platform A, the ends of said bar projecting beyond the sides of the platform, so that the boxes F F will be at the sides of the same. Each seed-box F is provided with a pendent tube, G, in the upper part of which, at the bottoms of the hoppers, horizontal seed-slides H H′ are placed and allowed to work freely. These slides have each a spring, *d*, bearing against its outer end, and said springs have a tendency to keep the slides H H′ shoved inward, so as to prevent the discharge of seed from the seed-boxes. This will be fully understood by referring to Fig. 1.

On the axle C there are keyed two wheels, I I—one at each side of the platform A, between it and the seed-boxes. These wheels I may be termed "double" ones, as each has a circular projection, *e*, at one side. The peripheries of the wheels I have pins *f* driven radially into them at suitable and equal distances apart, and the peripheries of the projections *e* have similar pins, *g*, driven into them. These pins *f g*, as the axle and wheels rotate, come in contact with arms *h* on the slides H H′ and force said slides outward to admit of the escape of the seed from the hoppers, the pins *g* in the projections *e* being in line with the centers of the spaces between the pins *f*, so that the slides will be actuated alternately, one being closed while the other is open.

In the upper part of each tube G, between the two slides H H′, there is fitted a slide, J, which is secured in position by a screw, *h′*. These slides J, by being adjusted farther in or out, contract or enlarge the space in the tubes G between the slides H H′, and it will therefore be seen that by adjusting these slides J a greater or less quantity of seed may be discharged at each dropping, as desired, and that by shoving the slides J fully inward the discharge of seed is entirely prevented. When the upper slides, H, are forced outward by the pins *f* the lower slides, H′, are pressed inward by their springs *d* and hold the seed, and when the upper slides, H, are forced back by the springs *d* the lower slides, H′, are forced outward by the pins *g* of the projections *e*, and the seed is discharged, the upper slides, H, serving as cut-offs, and the space between the slides H H′ serving as seed-measures, the capacity of which may, as previously stated, be regulated by adjusting the slides J.

To the lower end of each tube G there is secured a flexible tube, K, both of which tubes are inserted in metallic tubes L, having their lower ends of such a shape that they may serve as furrow-openers. These tubes L are secured to the rear ends of rods M, the front ends of which are connected by joints $h^*$ to the front end of the platform A. The rods M have rods N attached, which extend back of the tubes L, and have covering-shares O secured to them. Each rod N is connected by a wire, O′, to cranks *i i* at the ends of a shaft, P, which has its bearings at the rear of the platform, said shaft being connected by an arm, *j*, and link *k* with a lever, Q, within convenient reach of the driver on seat E, and this lever is secured at any desired point within the scope of its movement by a rack, R, secured to the upper part of one of the seed-boxes. By adjusting the lever Q the furrow-openers may be made to penetrate into the earth at a greater or less depth, as desired, and may be sustained above the surface of the earth when required.

The seed-dropping apparatus may be rendered inoperative at any time by disconnecting the wheel D from the axle C through the medium of the clutch, and in case it is desired to plant only one row of seed at once the slide J of one seed-box is shoved fully inward to prevent the discharge of seed from it.

Having thus described my invention, I claim as new and desire to secure by Letters Patent—

1. The two seed-slides H H′, placed one above the other at the upper part of the tubes G, and having spings *d* bearing against them, in combination with the wheels I and projections *e*, having pins *f g* in their peripheries, all arranged to operate substantially in the manner as and for the purpose set forth.

2. The regulating-slides J, in combination with the seed-slides H H′, arranged substantially as and for the purpose specified.

3. The combination of the metallic tubes L and covering-shares O, all arranged and applied so as to be capable of operating and being adjusted substantially as shown and described.

4. The seed-slides H H′, tubes G, springs *d*, wheels I, projections *e*, with the pins *f g*, in combination with the slides J, metallic tubes L, and the covering-shares O, all arranged to operate in the manner substantially as and for the purpose specified.

D. S. HOLMAN.

Witnesses:
ALBERT STAGE,
E. P. HARRIS.